(12) United States Patent
Tauchi et al.

(10) Patent No.: US 10,538,131 B2
(45) Date of Patent: Jan. 21, 2020

(54) PNEUMATIC TIRE

(71) Applicant: The Yokohama Rubber Co., LTD., Minato-ku, Tokyo (JP)

(72) Inventors: Lisa Tauchi, Hiratsuka (JP); Satoru Isobe, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 360 days.

(21) Appl. No.: 14/900,042

(22) PCT Filed: Jun. 17, 2014

(86) PCT No.: PCT/JP2014/066067
§ 371 (c)(1),
(2) Date: Dec. 18, 2015

(87) PCT Pub. No.: WO2014/203909
PCT Pub. Date: Dec. 24, 2014

(65) Prior Publication Data
US 2016/0137009 A1 May 19, 2016

(30) Foreign Application Priority Data

Jun. 21, 2013 (JP) ................. 2013-130941

(51) Int. Cl.
*B60C 15/00* (2006.01)
*B60C 15/024* (2006.01)
(Continued)

(52) U.S. Cl.
CPC .............. *B60C 15/024* (2013.01); *B60C 3/04* (2013.01); *B60C 15/0009* (2013.01);
(Continued)

(58) Field of Classification Search
CPC ................ B60C 15/00; B60C 15/0009; B60C 2015/009; B60C 13/003
See application file for complete search history.

(56) References Cited

U.S. PATENT DOCUMENTS 5,429,168 A * 7/1995 Lobb .................. B60C 3/04
152/454
5,622,576 A 4/1997 Lobb et al.
(Continued)

FOREIGN PATENT DOCUMENTS

JP H02-171308 7/1990
JP 04-218414 * 8/1992
(Continued)

OTHER PUBLICATIONS

English machine translation of JP11-227423. (Year: 1999).*
(Continued)

*Primary Examiner* — Robert C Dye
(74) *Attorney, Agent, or Firm* — Thorpe North & Western (57) ABSTRACT

When a tire that is mounted on a specified rim, inflated to an internal pressure of 50 kPa, and placed in a no-load state is viewed as a cross-section from the tire meridian direction, a position of 1.30×Hf on an outer surface of a sidewall portion, taking a rim flange height (Hf) of the specified rim as a reference, is defined as a point (P), a foot of a normal line (L) drawn from the point (P) to a carcass line of a main body portion (131) of a carcass layer (13) is defined as a point (M), and a point of intersection of the normal line (L) and a carcass line of a folded back portion (132) of the carcass layer (13) is defined as a point (T). At this time, a distance (a) mm from the point (M) to the point (T), a distance (b) mm from the point (T) to the point (P), and a specified load (x) kN have relationships such that a=0.019× x+13.3 and b=0.052×x+21.6, with a tolerance of not less than 0% and not more than 20%.

1 Claim, 7 Drawing Sheets

(51) Int. Cl.
*B60C 3/04* (2006.01)
*B60C 15/06* (2006.01)

(52) U.S. Cl.
CPC .......... *B60C 15/0036* (2013.01); *B60C 15/06* (2013.01); *B60C 2015/009* (2013.01)

(56) References Cited

U.S. PATENT DOCUMENTS

| | | | | |
|---|---|---|---|---|
| 6,044,885 | A * | 4/2000 | Kato | .................. B60C 3/04 |
| | | | | 152/539 |
| 6,269,856 | B1 * | 8/2001 | Ueyoko | .................. B60C 3/04 |
| | | | | 152/454 |
| 8,291,952 | B2 | 10/2012 | Asari | |
| 2010/0059161 | A1 * | 3/2010 | Asari | .................. B60C 3/04 |
| | | | | 152/546 |
| 2012/0267028 | A1 | 10/2012 | Laurent et al. | |
| 2013/0174956 | A1 | 7/2013 | Toyoda et al. | |

FOREIGN PATENT DOCUMENTS

| | | | |
|---|---|---|---|
| JP | H07-0164833 | | 6/1995 |
| JP | 11-227423 | * | 8/1999 |
| JP | 2005-212760 | | 8/2005 |
| JP | 2005-280456 | | 10/2005 |
| JP | 2006-069290 | * | 3/2006 |
| JP | 2006-218936 | * | 8/2006 |
| JP | 2007-210363 | | 8/2007 |
| JP | 2008-143291 | | 6/2008 |
| JP | 4724103 | | 7/2011 |
| JP | 2011-207319 | | 10/2011 |
| JP | 2013-510755 | | 3/2013 |
| WO | WO 2008-072425 | | 6/2008 |
| WO | WO 2011/057889 | | 5/2011 |
| WO | WO 2012/036292 | | 3/2012 |

OTHER PUBLICATIONS

Off-The-Road Tire Catalog. Goodyear Tire & Rubber Company. (Year: 2008).*
English machine translation of JP04-218414. (Year: 1992).*
English machine translation of JP2006-069290. (Year: 2006).*
International Search Report for International Application No. PCT/JP2014/066067 dated Sep. 2, 2014, 4 pages, Japan.

* cited by examiner

| | CONVENTIONAL EXAMPLE | WORKING EXAMPLE 1 | WORKING EXAMPLE 2 | WORKING EXAMPLE 3 | WORKING EXAMPLE 4 | WORKING EXAMPLE 5 |
|---|---|---|---|---|---|---|
| a [mm] | 18 | 22 | 20 | 24 | 22 | 22 |
| b [mm] | 36 | 40 | 39 | 43 | 40 | 40 |
| c [mm] | 12 | 12 | 12 | 12 | 12 | 12 |
| R/R' | 1.0 | 1.0 | 1.0 | 1.0 | 1.4 | 1.8 |
| LSR/SH | 0.15 | 0.15 | 0.15 | 0.15 | 0.15 | 0.15 |
| Hi/Hf | 1.4 | 1.4 | 1.4 | 1.4 | 1.4 | 1.4 |
| STRAIN INDEX OF CONTACT PORTION WITH RIM FLANGE PORTION | 100 | 102 | 103 | 100 | 108 | 106 |
| SIDE COMPACTION STRESS INDEX OF CARCASS LAYER FOLDED BACK PORTION | 100 | 110 | 107 | 111 | 110 | 110 |
| DURABILITY | 100 | 106 | 104 | 106 | 110 | 108 |

FIG. 3A

|  | WORKING EXAMPLE 6 | WORKING EXAMPLE 7 | WORKING EXAMPLE 8 | WORKING EXAMPLE 9 | WORKING EXAMPLE 10 | WORKING EXAMPLE 11 | WORKING EXAMPLE 12 |
|---|---|---|---|---|---|---|---|
| a [mm] | 22 | 22 | 22 | 22 | 22 | 22 | 22 |
| b [mm] | 40 | 40 | 40 | 40 | 40 | 40 | 40 |
| c [mm] | 12 | 12 | 12 | 12 | 16 | 18 | 16 |
| R/R' | 1.8 | 1.4 | 1.4 | 1.4 | 1.4 | 1.4 | 1.4 |
| LSR/SH | 0.45 | 0.45 | 0.85 | 0.45 | 0.45 | 0.45 | 0.45 |
| Hi/Hf | 1.4 | 1.4 | 1.4 | 1.4 | 1.4 | 1.4 | 1.65 |
| STRAIN INDEX OF CONTACT PORTION WITH RIM FLANGE PORTION | 110 | 122 | 110 | 122 | 122 | 122 | 122 |
| SIDE COMPACTION STRESS INDEX OF CARCASS LAYER FOLDED BACK PORTION | 110 | 110 | 110 | 110 | 110 | 110 | 110 |
| DURABILITY | 110 | 115 | 110 | 116 | 118 | 120 | 125 |

FIG. 3B

| TIRE SIZE | | SPECIFIED MAXIMUM LOAD | a (mm) | | | b (mm) | | | SH |
|---|---|---|---|---|---|---|---|---|---|
| | | kN | CENTER VALUE | min.(mm) | max.(mm) | CENTER VALUE | min.(mm) | max.(mm) | (mm) |
| 1600R25 | E*2 | 90.71 | 15.0 | 15.0 | 18.0 | 26.3 | 26.3 | 31.6 | 456.5 |
| 2700R49 | E*2 | 267.23 | 18.4 | 18.4 | 22.1 | 35.5 | 35.5 | 39.0 | 728.7 |
| 2400R35 | E*2 | 301.55 | 19.0 | 19.0 | 22.8 | 37.3 | 37.3 | 41.0 | 643 |
| 3300R51 | E*2 | 328.52 | 19.5 | 19.5 | 23.5 | 38.7 | 38.7 | 42.6 | 882.8 |
| 4000R57 | E*2 | 588.40 | 24.5 | 24.5 | 29.4 | 52.2 | 52.2 | 57.4 | 1073.1 |
| 1800R33 | E*2 | 106.89 | 15.3 | 15.3 | 18.4 | 27.2 | 27.2 | 29.9 | 519.4 |
| 17.5R25 | E*2 | 53.45 | 14.3 | 14.3 | 17.2 | 24.4 | 24.4 | 26.8 | 352 |
| 20.5R25 | E*2 | 71.59 | 14.7 | 14.7 | 17.6 | 25.3 | 25.3 | 27.9 | 456.5 |
| 23.5R25 | E*2 | 90.71 | 15.0 | 15.0 | 18.0 | 26.3 | 26.3 | 28.9 | 519 |
| 26.5R25 | E*2 | 112.78 | 15.4 | 15.4 | 18.5 | 27.5 | 27.5 | 30.2 | 581.5 |
| 29.5R25 | E*2 | 137.29 | 15.9 | 15.9 | 19.1 | 28.7 | 28.7 | 31.6 | 643 |
| 1800R25 | L*2 | 156.91 | 16.3 | 16.3 | 19.5 | 29.8 | 29.8 | 32.7 | 519 |
| 17.5R25 | L*1 | 69.63 | 14.6 | 14.6 | 17.5 | 25.2 | 25.2 | 27.7 | 352 |
| 20.5R25 | L*1 | 93.16 | 15.1 | 15.1 | 18.1 | 26.4 | 26.4 | 29.1 | 456.5 |
| 23.5R25 | L*1 | 119.15 | 15.6 | 15.6 | 18.7 | 27.8 | 27.8 | 30.6 | 519 |
| 26.5R25 | L*1 | 147.10 | 16.1 | 16.1 | 19.3 | 29.2 | 29.2 | 32.2 | 581.5 |
| 29.5R25 | L*1 | 176.52 | 16.7 | 16.7 | 20.0 | 30.8 | 30.8 | 33.9 | 643 |
| 750/65R25 | L*1 | 147.10 | 16.1 | 16.1 | 19.3 | 29.2 | 29.2 | 32.2 | 488 |

FIG. 4

| TIRE SIZE | | W1pt | | | W1tm | | |
|---|---|---|---|---|---|---|---|
| | | min.(mm) | max.(mm) | 5.3%<W1pt<6.8% | min.(mm) | max.(mm) | 1.7%<W1tm<3.2% |
| 1600R25 | E*2 | 24 | 29 | 5.3% | 6.4% | 17 | 20 | 3.6% | 4.3% |
| 2700R49 | E*2 | 33 | 36 | 4.5% | 4.9% | 20 | 24 | 2.8% | 3.3% |
| 2400R35 | E*2 | 34 | 38 | 5.3% | 5.9% | 21 | 25 | 3.3% | 3.9% |
| 3300R51 | E*2 | 36 | 39 | 4.0% | 4.4% | 21 | 26 | 2.4% | 2.9% |
| 4000R57 | E*2 | 48 | 53 | 4.5% | 4.9% | 27 | 32 | 2.5% | 3.0% |
| 1800R33 | E*2 | 25 | 27 | 4.8% | 5.3% | 17 | 20 | 3.2% | 3.9% |
| 17.5R25 | E*2 | 22 | 25 | 6.4% | 7.0% | 16 | 19 | 4.5% | 5.4% |
| 20.5R25 | E*2 | 23 | 26 | 5.1% | 5.6% | 16 | 19 | 3.5% | 4.2% |
| 23.5R25 | E*2 | 24 | 27 | 4.7% | 5.1% | 17 | 20 | 3.2% | 3.8% |
| 26.5R25 | E*2 | 25 | 28 | 4.3% | 4.8% | 17 | 20 | 2.9% | 3.5% |
| 29.5R25 | E*2 | 26 | 29 | 4.1% | 4.5% | 17 | 21 | 2.7% | 3.3% |
| 1800R25 | L*2 | 27 | 30 | 5.3% | 5.8% | 18 | 21 | 3.5% | 4.1% |
| 17.5R25 | L*1 | 23 | 26 | 6.6% | 7.3% | 16 | 19 | 4.6% | 5.5% |
| 20.5R25 | L*1 | 24 | 27 | 5.3% | 5.9% | 17 | 20 | 3.6% | 4.4% |
| 23.5R25 | L*1 | 26 | 28 | 4.9% | 5.4% | 17 | 21 | 3.3% | 4.0% |
| 26.5R25 | L*1 | 27 | 30 | 4.6% | 5.1% | 18 | 21 | 3.0% | 3.7% |
| 29.5R25 | L*1 | 28 | 31 | 4.4% | 4.8% | 18 | 22 | 2.8% | 3.4% |
| 750/65R25 | L*1 | 27 | 30 | 5.5% | 6.1% | 18 | 21 | 3.6% | 4.4% |

FIG. 5A

| TIRE SIZE | | W2tm | | | | W2pt | | | |
|---|---|---|---|---|---|---|---|---|---|
| | | min.(mm) | max.(mm) | 2.8%<W2tm<4.3% | | min.(mm) | max.(mm) | 1.0%<W1pt−W2pt<3.0% | |
| 1600R25 | E*2 | 24 | 29 | 5.3% | 6.3% | 14 | 17 | 2.2% | 2.7% |
| 2700R49 | E*2 | 29 | 35 | 4.0% | 4.8% | 19 | 21 | 1.9% | 2.1% |
| 2400R35 | E*2 | 30 | 37 | 4.7% | 5.7% | 20 | 22 | 2.3% | 2.5% |
| 3300R51 | E*2 | 31 | 38 | 3.5% | 4.3% | 21 | 23 | 1.7% | 1.9% |
| 4000R57 | E*2 | 39 | 47 | 3.6% | 4.4% | 28 | 30 | 1.9% | 2.1% |
| 1800R33 | E*2 | 25 | 29 | 4.7% | 5.7% | 14 | 16 | 2.0% | 2.2% |
| 17.5R25 | E*2 | 23 | 27 | 6.5% | 7.8% | 13 | 14 | 2.7% | 3.0% |
| 20.5R25 | E*2 | 23 | 28 | 5.1% | 6.2% | 13 | 15 | 2.2% | 2.4% |
| 23.5R25 | E*2 | 24 | 29 | 4.6% | 5.6% | 14 | 15 | 2.0% | 2.2% |
| 26.5R25 | E*2 | 25 | 30 | 4.2% | 5.1% | 15 | 16 | 1.8% | 2.0% |
| 29.5R25 | E*2 | 25 | 31 | 4.0% | 4.8% | 15 | 17 | 1.7% | 1.9% |
| 1800R25 | L*2 | 26 | 31 | 5.0% | 6.0% | 16 | 17 | 2.2% | 2.5% |
| 17.5R25 | L*1 | 23 | 28 | 6.6% | 8.0% | 13 | 15 | 2.8% | 3.1% |
| 20.5R25 | L*1 | 24 | 29 | 5.3% | 6.3% | 14 | 15 | 2.3% | 2.5% |
| 23.5R25 | L*1 | 25 | 30 | 4.8% | 5.8% | 15 | 16 | 2.1% | 2.3% |
| 26.5R25 | L*1 | 26 | 31 | 4.4% | 5.3% | 16 | 17 | 2.0% | 2.2% |
| 29.5R25 | L*1 | 27 | 32 | 4.1% | 5.0% | 16 | 18 | 1.9% | 2.1% |
| 750/65R25 | L*1 | 26 | 31 | 5.3% | 6.3% | 16 | 17 | 2.3% | 2.6% |

FIG. 5B

PNEUMATIC TIRE

TECHNICAL FIELD

The present technology relates to a pneumatic tire, and more particularly relates to a pneumatic tire having improved durability performance.

BACKGROUND

Generally, radial tires for construction vehicles are used for extended periods of time with heavy loads and under poor road conditions, and thus a high durability performance is required. In particular, there is a strong demand to improve the durability performance of the bead portion.

As a conventional radial tire for construction vehicles relating to this issue, technology is known that is disclosed in Japanese Patent No. 4724103B.

SUMMARY

The present technology provides a pneumatic tire with improved durability performance.

A pneumatic tire of the present technology includes: a pair of bead cores, a pair of bead fillers that are disposed on the outer sides of the pair of bead cores in the tire radial direction; and a carcass layer that extends between the pair of bead cores and is folded back and fixed, wrapping around the bead cores and the bead fillers. When the tire that is mounted on a specified rim, inflated to an internal pressure of 50 kPa, and placed in a no-load state is viewed as a cross-section from the tire meridian direction, a position of 1.30×Hf on an outer surface of a sidewall portion, taking a rim flange height Hf of the specified rim as a reference, is defined as a point P, a foot of a normal line L drawn from the point P to a carcass line of a main body portion of the carcass layer is defined as a point M and a point of intersection of the normal line L and a carcass line of a folded back portion of the carcass layer is defined as a point T, and a distance a mm from the point M to the point T, a distance b mm from the point T to the point P, and a specified load x kN have relationships such that a=0.019×x+13.3 and b=0.052×x+21.6, with a tolerance of not less than 0% and not more than 20%.

In the pneumatic tire according to the present technology, by appropriately adjusting the distances a and b with respect to the specified load x kN at the position of 1.30×Hf (the point P), collapsing of the carcass layer under tire usage conditions is suppressed. As a result, there is an advantage that failure of the bead portion is suppressed and the tire durability is improved.

DETAILED DESCRIPTION

The present technology is described below in detail with reference to the accompanying drawings. However, the present technology is not limited to this embodiment. Additionally, components which can possibly or obviously be substituted while maintaining consistency with the present technology are included in components of the embodiment. Additionally, a plurality of modified examples that are described in the embodiment can be freely combined within a scope of obviousness for a person skilled in the art.

[Pneumatic Tire]

Figure 1:
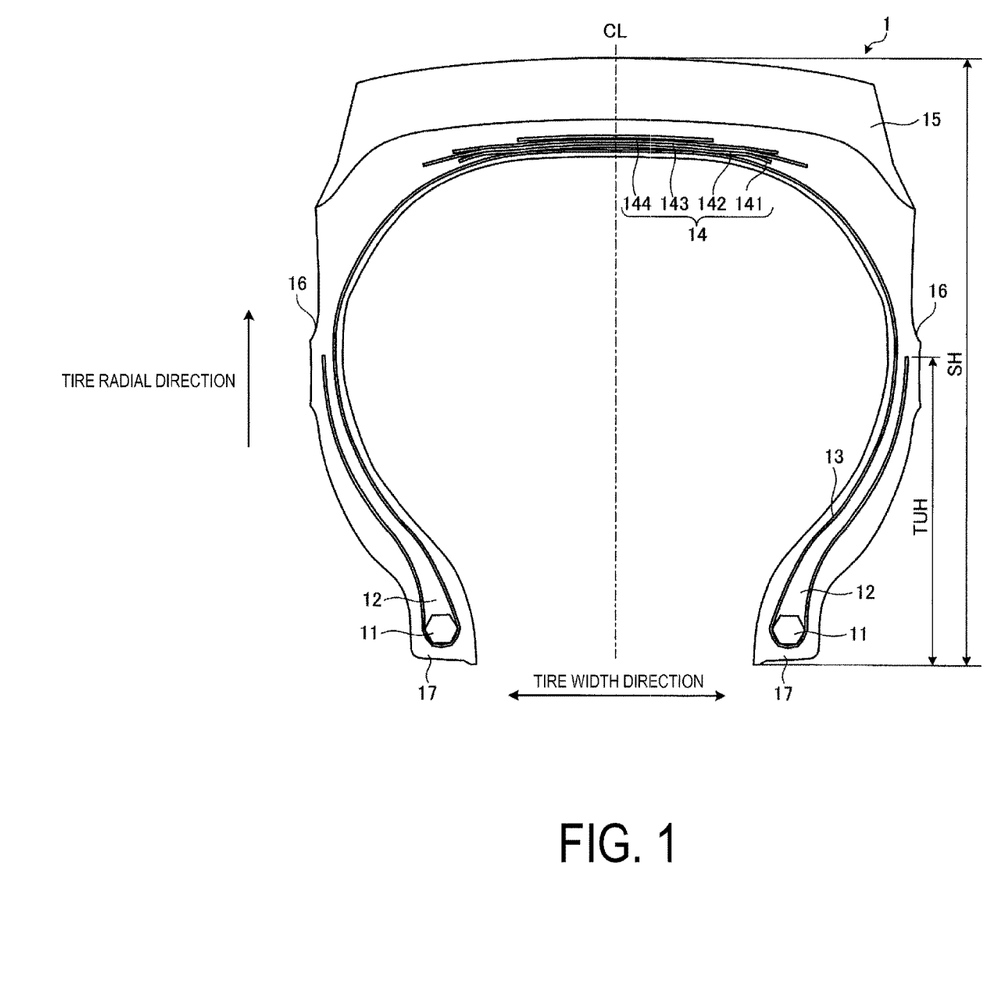
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. FIG. 1 illustrates one side of the cross-sectional view in the tire radial direction. Further, as one example of the pneumatic tire, FIG. 1 illustrates a radial tire for construction vehicles that is called an off-the-road tire (OR tire)( ).

Note that, in FIG. 1, the cross-section in the tire meridian direction refers to a cross-section of a tire being cut along a plane that includes a tire rotational axis (not illustrated). Further, a reference symbol CL, which corresponds to a tire equatorial plane, refers to a plane that passes through a center point of a tire in the direction of the tire rotational axis and that is perpendicular to the tire rotational axis. Further, a tire width direction refers to a direction parallel to the tire rotational axis, and the tire radial direction refers to a direction perpendicular to the tire rotational axis.

This pneumatic tire 1 has an annular structure centered around the tire rotational axis, and includes a pair of bead cores 11, 11, a pair of bead fillers 12, 12, a carcass layer 13, a belt layer 14, a tread rubber 15, a pair of side wall rubbers 16, 16, and a pair of rim cushion rubbers 17, 17 (see FIG. 1). Note that boundaries of the bead fillers 12, the tread rubber 15, the side wall rubbers 16 and the rim cushion rubbers 17 are not illustrated in FIG. 1.

The pair of bead cores 11, 11, which are annular members formed by bundling a plurality of bead wires, form the core of the left and right bead portions. The pair of bead fillers 12, 12 are disposed on peripheries of the pair of bead cores 11, 11 in the tire radial direction so as to reinforce the bead portions.

The carcass layer 13 extends between the left and right bead cores 11, 11 in toroidal form, forming a framework for the tire. Additionally, both edges of the carcass layer 13 are folded from an inner side in the tire width direction to an outer side in the tire width direction and fixed so as to wrap around the bead cores 11 and the bead fillers 12. Additionally, the carcass layer 13 is constituted by a plurality of carcass cords that are formed from steel, and covered by a coating rubber and subjected to a rolling process. The carcass layer 13 has a carcass angle (an inclination angle of the direction of the fibers of the carcass cords with respect to a tire circumferential direction), as an absolute value, of not less than 85° and not more than 95°.

The belt layer 14 is formed by laminating at least four belt plies 141 to 144, and is disposed to extend over the outer circumference of the carcass layer 13. Generally, in an OR tire, the belt layer 14 is formed by laminating four to eight belt plies (not illustrated).

Each of the belt plies 141 to 144 is formed by steel cords which are covered by a coating rubber and subjected to a rolling process. Further, each of the belt plies 141 to 144 has a belt angle of a different sign relative to the adjacent belt plies, and the belt plies are laminated so that the inclination angles of the belt cords are horizontally inverted in an alternate manner. In this way, a crossply configuration is formed, and the structural strength of the belt layer 14 is enhanced.

The tread rubber 15 is disposed on an outer circumference of the carcass layer 13 and the belt layer 14 in the tire radial direction, and forms a tread portion of the tire. The pair of side wall rubbers 16, 16 are each disposed on the outer side of the carcass layer 13 in the tire width direction so as to form left and right sidewall portions. The pair of rim cushion rubbers 17, 17 are each disposed on the inner side of the left and right bead cores 11, 11 and a folded back portion of the carcass layer 13 in the tire radial direction, and form contact surfaces of the left and right bead portions with respect to a rim flange.

It should be noted that, for the radial tire for construction vehicles, it is preferable that, with respect to a tire cross-sectional height SH, a height TUH of an edge of the folded back portion of the carcass layer 13 be within a range of 0.70≤TUH/SH. In this manner, the structural strength of the bead portions and the side wall portions can be appropriately secured. An upper limit of the ratio TUH/SH is not particularly limited, but in a general tire structure, as the edge of the folded back portion of the carcass layer 13 is positioned in the tire radial direction from the belt layer 14 (see FIG. 1), restrictions may apply.

[Bead Structure]

Figure 2:
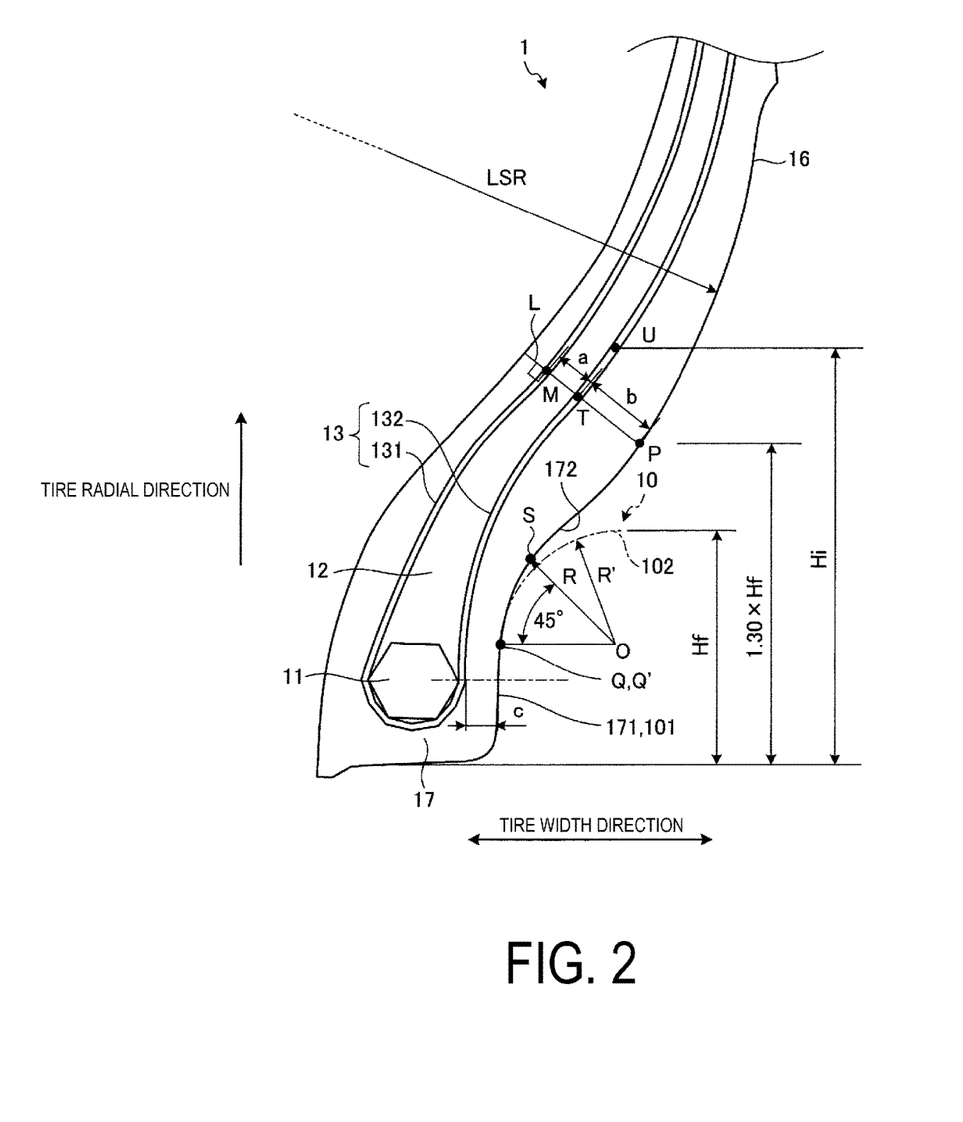
FIG. 2 is an explanatory view illustrating a bead portion of the pneumatic tire illustrated in FIG. 1.

FIG. 2 is an explanatory view illustrating a bead portion of the pneumatic tire illustrated in FIG. 1. FIG. 2 illustrates an enlarged cross-sectional view of one of the bead portions when the tire is mounted on a specified rim, inflated to an internal pressure of 50 kPa, and placed in a no-load state. Further, in FIG. 2, a virtual line denoted by a reference symbol 10 indicates a rim flange portion of the specified rim.

Generally, radial tires for construction vehicles are used for extended periods of time with heavy loads and under poor road conditions, and thus a high durability performance is required. In particular, there is a strong demand to improve the durability performance of the bead portion. Here, in order to improve the durability of the pneumatic tire 1, the following bead structure is provided (see FIG. 2).

First, the tire is mounted on a specified rim, inflated to an internal pressure of 50 kPa, and placed in a no-load state.

Here, "specified rim" refers to an "applicable rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). Further, as reference, a "specified internal pressure" refers to a "maximum air pressure" defined by JATMA, a maximum value in "tire load limits at various cold inflation pressures" defined by TRA, or "inflation pressures" defined by ETRTO. In addition, a "specified load" that will be described later refers to a "maximum load capacity" defined by JATMA, a maximum value of "tire load limits at various cold inflation pressures" defined by TRA, or a "load capacity" defined by ETRTO. However, with JATMA, in the case of passenger car tires, the specified internal pressure is an air pressure of 180 kPa, and the specified load is 88% of the maximum load capacity.

Next, as illustrated in FIG. 2, when viewed as a cross-section from the tire meridian direction, a position of 1.30× Hf on the outer surface of the sidewall portion, taking a rim flange height Hf of the specified rim as a reference, is defined as a point P. The rim flange height Hf is measured as a maximum height of a rim flange portion 10, taking a measurement point of the rim diameter as a reference.

In addition, a foot of a normal line L drawn from the point P to a carcass line (not illustrated) of a main body portion 131 of the carcass layer 13 is defined as a point M, and an intersection of the normal line L and a carcass line (not illustrated) of a folded back portion 132 of the carcass layer 13 is defined as a point T. The carcass line is a line that passes through a center of each of the carcass main body portion 131 and the folded back portion 132 in a cross-sectional view in the tire meridian direction.

At this time, a distance a mm from the point M to the point T, a distance b mm from the point T to the point P, and a specified load x kN have a relationship as expressed by the following Formula (1) and Formula (2). Further, a tolerance of the distances a and b is from not less than 0% to not more than 20%.

$$a = 0.019 \times x + 13.3 \tag{1}$$

$$b = 0.052 \times x + 21.6 \tag{2}$$

In addition, in the pneumatic tire 1, when the tire is mounted on the specified rim, inflated to the internal pressure of 50 kPa, and placed in the no-load state, a curvature radius R of the contact surface with respect to the rim flange portion 10 of the specified rim and a curvature radius R' of the rim flange portion 10 of the specified rim have a relationship such that $1.2 \leq R/R' \leq 1.6$.

The curvature radii R, R' are measured as follows.

As illustrated in FIG. 2, in the specified rim of the radial tire for construction vehicles, in a cross-sectional view of the rim, a fitting surface of the rim flange portion 10 has a linear portion 101 and an arc portion 102. The linear portion 101, which is a portion that extends in a straight line toward the outer side in the tire radial direction, is inclined relative to the radial direction of the rim within a range of 0° to 3°. The arc portion 102, which is a portion that curves in an arc shape outward in the tire width direction as it is closer to the outer side in the tire radial direction from the linear portion 101, is contiguous to the linear portion 101 at an inflection point Q'. The curvature radius R' of the rim flange portion 10 is measured as the curvature radius of the arc portion 102. Further, a center O of the curvature radius R' is on a straight line that passes through the inflection point Q' and that is parallel to a rotational axis of the rim.

In addition, in the radial tire for construction vehicles, a rim fitting surface of the bead portion has a linear portion 171 and a curved portion 172 corresponding to the rim flange portion 10 of the specified rim. The linear portion 171, which is a portion that extends in a straight line from a bead heel toward the outer side in the tire radial direction, is inclined relative to the tire equatorial plane CL (see FIG. 1) within a range of 0° to 3°. The curved portion 172, which is a portion that curves in an arc shape outward in the tire width direction as it is closer to the outer side in the tire radial direction from the linear portion 171, is contiguous to the linear portion 171 at an inflection point Q.

Here, when the tire is mounted on the specified rim, inflated to the internal pressure of 50 kPa, and placed in the no-load state, the inflection point Q of the tire is in the same position as the inflection point Q' of the rim flange portion 10, and further, the center O of the curvature radius R' of the rim flange portion 10 is on a virtual line drawn from the inflection point Q of the tire in the direction of the tire rotational axis. At this time, a point S which satisfies an angle QOS=45° is provided on the curved portion 172 of the tire. Under the above-described measurement conditions, the curvature radius R of the contact surface of the tire is measured as the curvature radius of the curved portion 172 at the point S.

Further, in the pneumatic tire 1, a radius LSR of a profile line that continues from the sidewall portion to the curved portion 172 of the bead portion and the tire cross-sectional height SH have a relationship such that 0.25≤LSR/SH≤0.65 (see FIG. 1 and FIG. 2).

The radius LSR of the sidewall portion is measured when the tire is mounted on the specified rim, inflated to the internal pressure of 50 kPa, and placed in the no-load state.

The tire cross-sectional height SH refers to ½ of a difference between an external tire diameter and a rim diameter, and is measured when the tire is mounted on the specified rim, inflated to the internal pressure of 50 kPa, and placed in the no-load state.

Further, in the pneumatic tire 1, a gauge c mm of the rim cushion rubber 17 at a center of gravity position of the bead core 11, and the specified load x kN have a relationship as expressed in the following Formula (3). Further, a tolerance of the gauge c is from not less than 0% to not more than 20%.

$$c=0.004 \times x + 13.5 \quad (3)$$

As illustrated in FIG. 2, when viewed as a cross-section from the tire meridian direction, the gauge c mm of the rim cushion rubber 17 is measured on a virtual line that is drawn from the center of gravity of the bead core 11 in parallel to the tire rotational axis.

In addition, in the pneumatic tire 1, a height Hi of an inflection point U of the folded back portion 132 of the carcass layer 13, and the rim flange height Hf are within a range of 1.65≤Hi/Hf (see FIG. 2). An upper limit of the ratio Hi/Hf is not particularly limited, but restrictions occur due to the shape of the tire.

The height Hi of the inflection point U of the folded back portion 132 is measured taking a measurement point of the rim diameter as a reference, when the tire that is mounted on the specified rim, inflated to the internal pressure of 50 kPa, and placed in the no-load state is viewed as a cross-section from the tire meridian direction.

As described above, the pneumatic tire 1 is provided with the pair of bead cores 11, 11, the pair of bead fillers 12, 12 that are disposed on the outer sides of the pair of bead cores 11, 11 in the tire radial direction, and the carcass layer 13 that extends between the pair of bead cores 11, 11, and is folded back and fixed, wrapping around the bead cores 11 and the bead fillers 12 (see FIG. 1). Further, when the tire that is mounted on the specified rim, inflated to the internal pressure of 50 kPa, and placed in the no-load state is viewed as a cross-section from the tire meridian direction, the position of 1.30×Hf on the outer surface of the sidewall portion, taking the rim flange height Hf of the specified rim as a reference, is defined as the point P, the foot of the normal line L drawn from the point P to the carcass line of the main body portion 131 of the carcass layer 13 is defined as the point M, and the point of intersection of the normal line L and the folded back portion 132 of the carcass layer 13 is defined as the point T (see FIG. 2). At this time, the distance a mm from the point M to the point T, the distance b mm from the point T to the point P, and the specified load x kN have relationships such that a=0.019×x+13.3 and b=0.052×x+21.6, with a tolerance of not less than 0% and not more than 20%.

In this configuration, by appropriately adjusting the distances a and b at the position of 1.30×Hf (the point P) with respect to the specified load x kN, collapsing of the carcass layer 13 under tire usage conditions is suppressed. As a result, there is an advantage that failure of the bead portion is suppressed, and the tire durability improves. Specifically, as the distance a is within the above-described range, a shearing strain acting on the carcass layer 13 is reduced. In particular, rupture of the carcass cords is suppressed. Furthermore, as the distance b is within the above-described range, a rubber gauge of the bead portion is appropriately adjusted, and failure of the bead portion caused by compaction strain in a loaded state is suppressed. In particular, at the position of 1.30×Hf, the shearing strain acting on the folded back portion 132 of the carcass layer 13 is large compared to other regions. Therefore, appropriately adjusting the distances a and b at this position is extremely beneficial.

Further, in the pneumatic tire 1, when the tire that is mounted on the specified rim, inflated to the internal pressure of 50 kPa, and placed in the no-load state is viewed as a cross-section from the tire meridian direction, the curvature radius R of the contact surface with respect to the rim flange portion 10 of the specified rim, and the curvature radius R' of the rim flange portion 10 of the specified rim have the relationship such that 1.2≤R/R'≤1.6 (see FIG. 2). This has the advantage that the ratio R/R' is appropriately adjusted. Specifically, given that 1.2≤R/R', the curvature radius R of the rim contact surface of the tire is appropriately secured, and when the tire is inflated, the bite amount of the bead portion with respect to the rim flange portion 10 of is reduced, and the compaction strain acting on the rim contact surface of the tire is reduced. Further, given that R/R'≤1.6, the difference between the curvature radii R, R' of the tire and the rim is alleviated, and the strain acting on the rim contact surface of the tire is reduced. In addition, by setting both the above-described distances a and b and the ratio R/R' in the above-described range, an advantage is obtained that the form of the bead portion is appropriately adjusted.

Furthermore, in the pneumatic tire 1, when the tire that is mounted on the specified rim, inflated to the internal pressure of 50 kPa, and placed in the no-load state is viewed as a cross-section from the tire meridian direction, the radius LSR of the profile line that continues from the sidewall portion to the bead portion, and the tire cross-sectional height SH have the relationship such that 0.25≤LSR/SH≤0.65 (see FIG. 2). This has the advantage that the ratio LSR/SH is appropriately adjusted. Specifically, given that 0.25≤LSR/SH, the radius LSR is appropriately secured, and when the tire is inflated, the bite amount of the bead portion with respect to the rim flange portion 10 is reduced, and the compaction strain acting on the rim contact surface of the tire is reduced. Further, given that LSR/SH≤0.65, the strain acting on the rim contact surface of the tire is reduced. In addition, by setting both the above-described distances a and b and the ratio LSR/SH in the above-described ranges, an advantage is obtained that the form of the bead portion is appropriately adjusted.

Furthermore, in the pneumatic tire 1, the gauge c mm of the rim cushion rubber 17 at the center of gravity position of the bead core 11 and the specified load x kN have the relationship such that c=0.004×x+13.5, with a tolerance of not less than 0% and not more than 20% (see FIG. 2). This has the advantage that the gauge c mm of the rim cushion rubber 17 is appropriately adjusted. Specifically, as the lower limit of the gauge c (when the tolerance is 0%) is within the above-described range, the gauge c mm of the rim cushion rubber 17 is appropriately secured, and exposure of the carcass cords caused by wear when the tire is used is suppressed. Further, as the upper limit of the gauge c (when the tolerance is 20%) is within the above-described range, ease of manufacture of the tire is appropriately secured.

In addition, in the pneumatic tire 1, when the tire that is mounted on the specified rim, inflated to the internal pressure of 50 kPa, and placed in the no-load state is viewed as a cross-section from the tire meridian direction, the height Hi of the inflection point U of the folded back portion 132 of the carcass layer 13, which takes the measurement point of the rim diameter as a reference, and the rim flange height Hf are in the range of $1.65 \leq Hi/Hf$ (see FIG. 2). With the above-described configuration, the height Hi of the inflection point U of the folded back portion 132 is secured, and an advantage is thus obtained that stress acting on the rim fitting portion of the tire when the tire is inflated is effectively reduced.

[Scope of Application]

It is preferable that the pneumatic tire 1 be applied to radial tires for construction vehicles. The radial tire for construction vehicles, which is a tire that is mounted on a construction vehicle that travels over uneven ground, such as civil engineering construction sites, is mounted on construction vehicles such as large dump trucks, tire rollers, scrapers, graders, cranes, and wheel loaders.

However, the present technology is not limited to the above-described applications, and the pneumatic tire 1 may be applied to radial tires for heavy loads that are mounted on, for example, trucks and buses (not illustrated).

EXAMPLES

[Performance Tests]

Figure 3A:
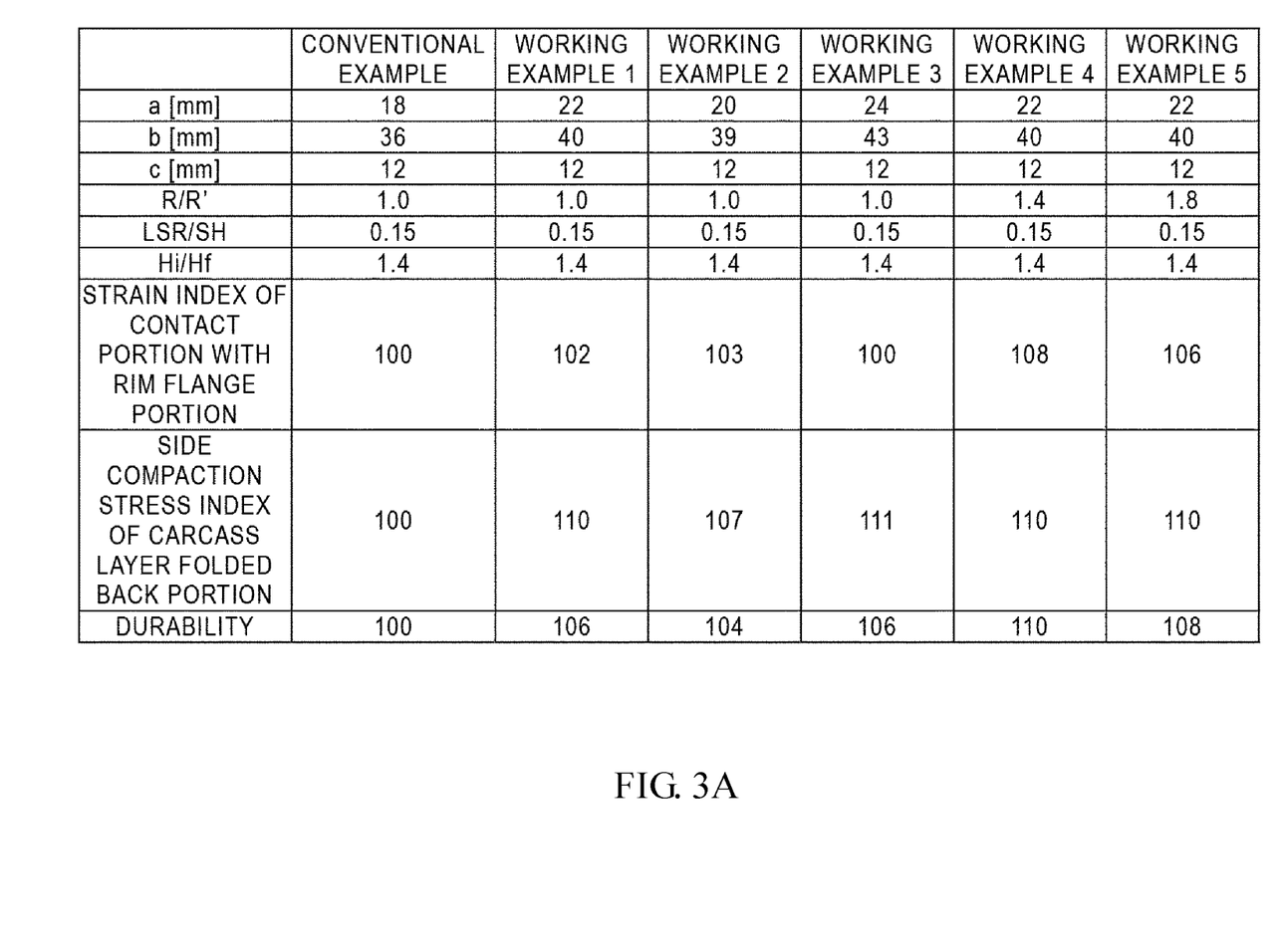
FIGS. 3A-3b include a table showing results of performance testing of pneumatic tires according to the embodiment of the present technology.
Figure 3B:
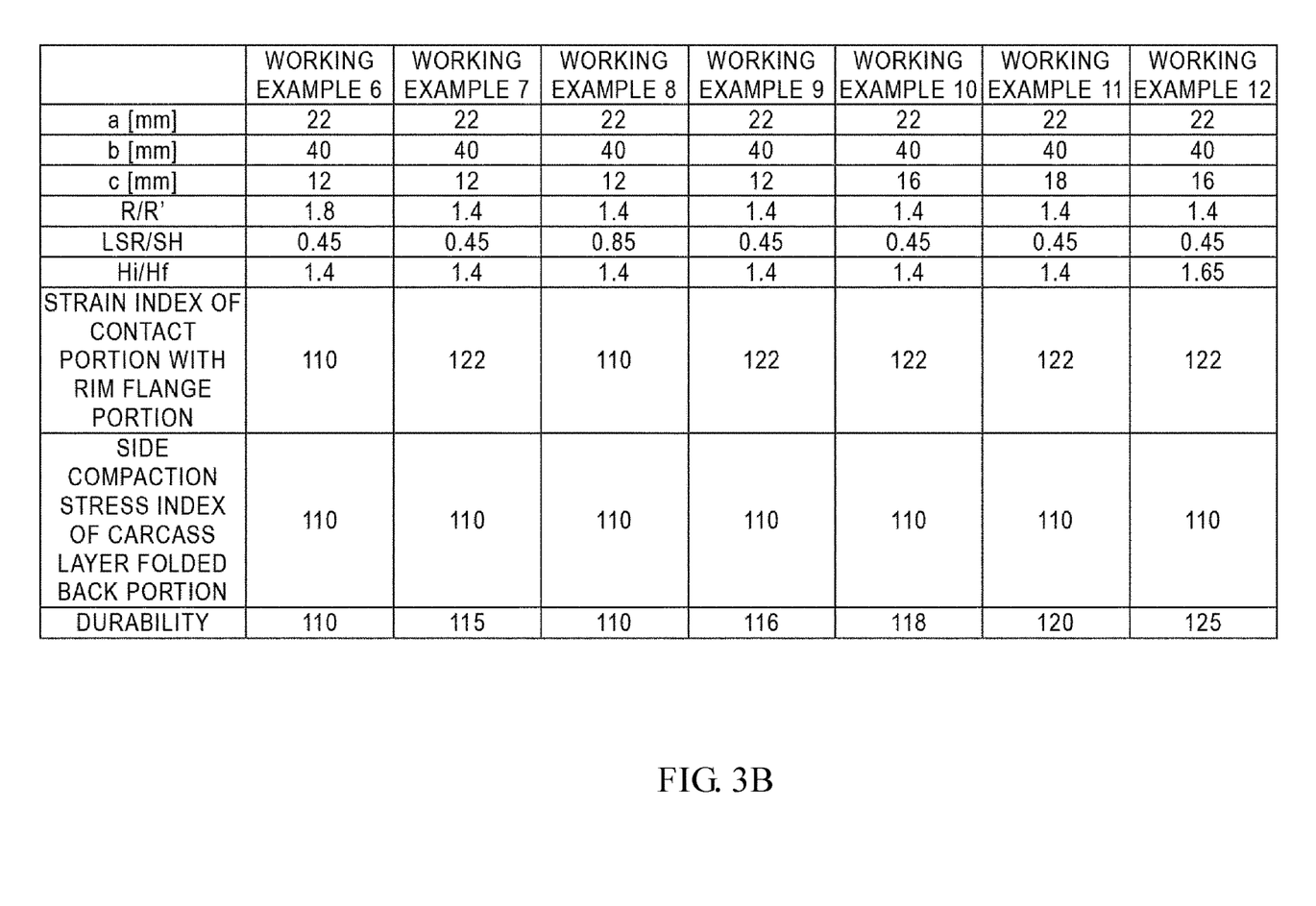

FIGS. 3A-3B include a table showing results of performance testing of pneumatic tires according to the embodiment of the present technology.

In this performance testing, a plurality of mutually different test tires were evaluated in relation to (1) strain index in the contact portion with the rim flange portion, (2) compaction stress index in the folded back portion 132 of the carcass layer 13, and (3) durability performance. In this performance testing, test tires of a tire size of 3300R51 E*2 were assembled onto a TRA specified rim, and a TRA specified air pressure and a TRA specified load (328.52 kN) were applied to the test tires.

(1) The strain index of the contact portion with the rim flange portion, and (2) the compaction stress index in the folded back portion of the carcass layer were obtained by analyzing and calculating, using the finite element method, the strain and the compaction stress when the tire was mounted on the specified rim, inflated to the specified internal pressure, and placed in the specified load.

(3) Durability evaluation was carried out with low pressure durability tests using an indoor drum testing machine. Then, a running speed was set to 25 km/h, the load was increased from the specified load by 5% every 12 hours, and the running time up to when the tire failed was measured. Then, on the basis of the measurement results, index evaluation was performed taking Conventional Example as a reference (100). A larger numerical value is preferable in the evaluations.

The test tires of Working Examples 1 to 12 and the test tire of Conventional Example have the configuration illustrated in FIG. 1 and FIG. 2. In the test tires of the above-described tire size, numerical ranges of the distances a and b, and the gauge c that satisfy the conditions of Formulas (1) to (3) are as follows: a=20 mm to 24 mm, b=39 mm to 43 mm, and c=12 mm to 18 mm.

As shown in the test results, with the test tires of the Working Examples 1 to 12, it can be seen that (1) the strain index of the contact portion with the rim flange portion, (2) the compaction stress index in the folded back portion 132 of the carcass layer 13, and (3) the durability performance are improved.

Examples of Application to Radial Tire for Construction Vehicles

Figure 4:
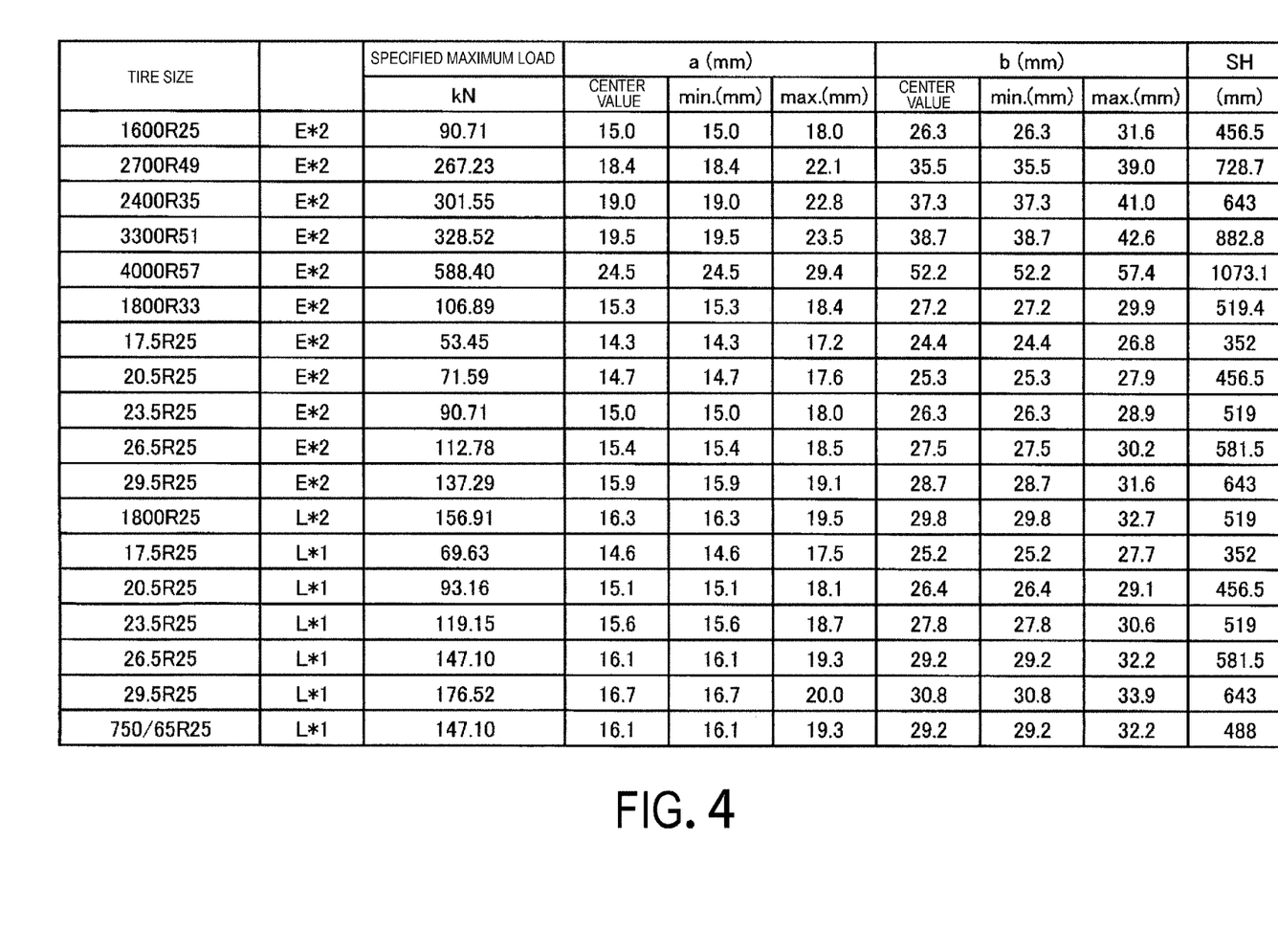
FIG. 4 is a table illustrating specific examples of the pneumatic tire according to the embodiment of the present technology.
Figure 5A:
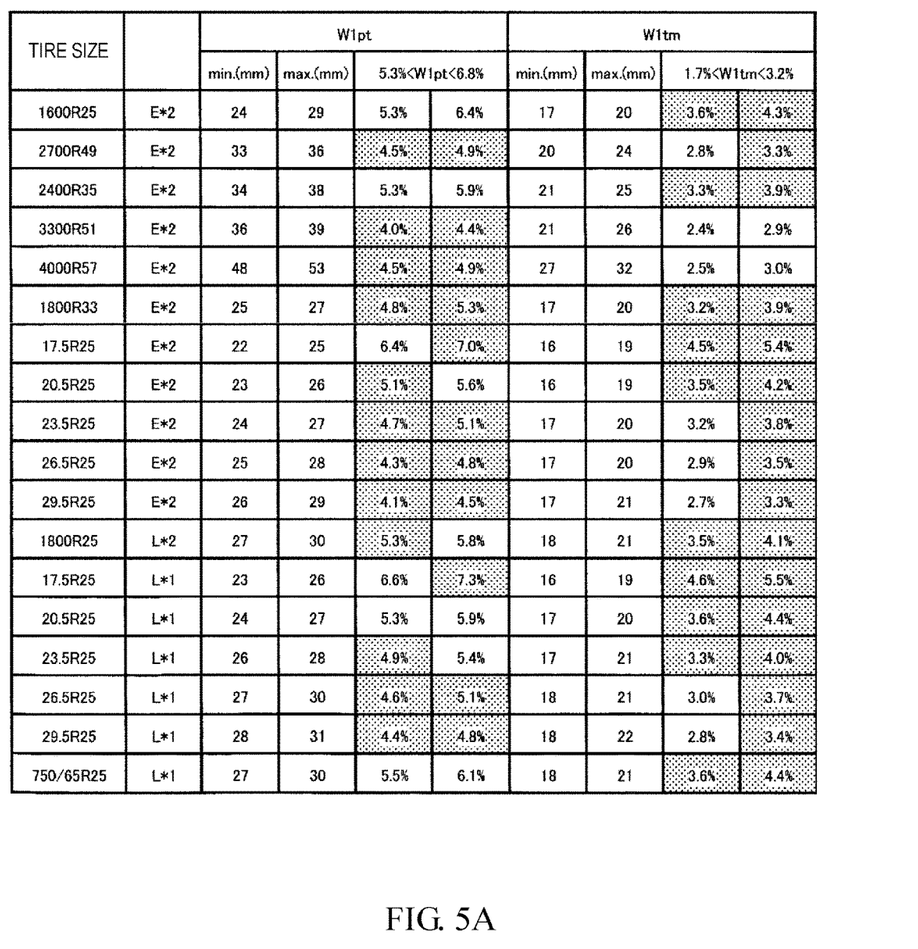
FIGS. 5A-5B include a table illustrating specific examples of the pneumatic tire according to the embodiment of the present technology.
Figure 5B:
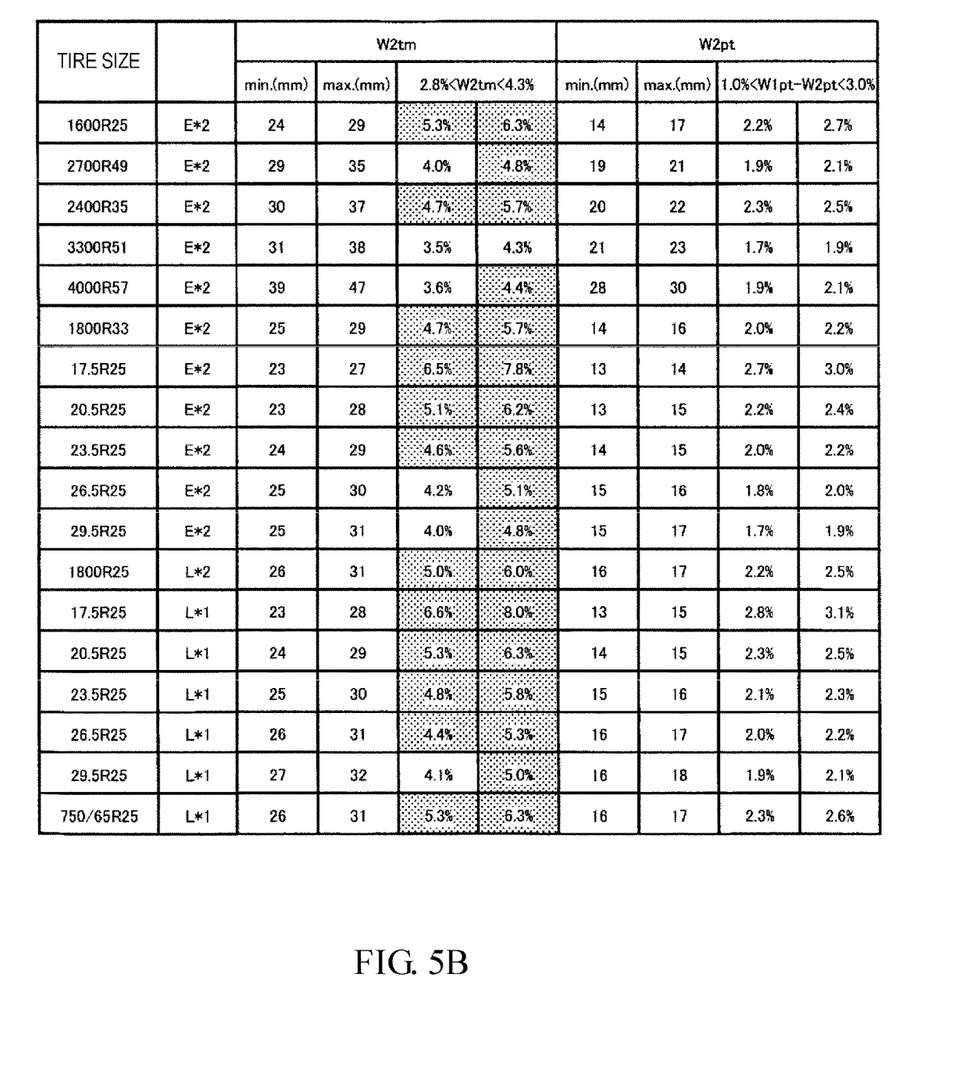

FIG. 4 and FIGS. 5A-5B are tables showing specific examples of the pneumatic tire according to the embodiment of the present technology.

FIG. 4 and FIGS. 5A-5B show specific examples when radial tires for construction vehicles having different tire sizes satisfy the conditions of the above-described Formulas (1) and (2) at the position of 1.30×Hf (the point P in FIG. 2). In FIGS. 5A-5B, numerical values W1pt, W1tm, W2tm and W2Pt are predetermined gauges at positions 1.18×Hf and 0.81×Hf, and measurement conditions thereof are the same as those described in Japanese Patent No. 4724103B.

As shown in FIG. 4 and FIGS. 5A-5B, of the tires that satisfy the conditions of the above-described Formulas (1) and (2) at the position 1.30×Hf, it can be seen that the predetermined gauge conditions described in Japanese Patent No. 4724103B are not satisfied in any of the tire sizes. Therefore, the conditions of the above-described Formulas (1) and (2), and the predetermined gauge conditions described in Japanese Patent No. 4724103B are incompatible.

In particular, in a tire of a low aspect ratio size, it can be seen that the gauges at the positions 1.18×Hf and 0.81×Hf diverge significantly from the conditions described in Japanese Patent No. 4724103B. In contrast, in tires (not illustrated) that satisfy the conditions described in Japanese Patent No. 4724103B, the conditions of the above-described Formulas (1) and (2) are not satisfied, and there is a tendency for the distances a and b at the position 1.30×Hf to become small. It can therefore be predicted that the shearing strain acting on the folded back portion 132 of the carcass layer 13 will become large and rupture of the carcass cords more easily occur.

What is claimed is:

1. A pneumatic tire comprising:
 a pair of bead cores;
 a pair of bead fillers that are disposed on outer sides of the pair of bead cores in a tire radial direction; and
 a carcass layer that extends between the pair of bead cores and is folded back and fixed, wrapping around the bead cores and the bead fillers; wherein
 when the tire that is mounted on a specified rim, inflated to an internal pressure of 50 kPa, and placed in a no-load state is viewed as a cross-section from a tire meridian direction,
 a position of 1.30×Hf on an outer surface of a sidewall portion, taking a rim flange height Hf of the specified rim as a reference, is defined as a point P, a foot of a normal line L drawn from the point P to a carcass line of a main body portion of the carcass layer is defined as a point M, and a point of intersection of the normal line L and a carcass line of a folded back portion of the carcass layer is defined as a point T, and
 a distance a mm from the point M to the point T, a distance b mm from the point T to the point P, and a specified load x kN have relationships such that a=0.019×x+13.3 and b=0.052×x+21.6, with a tolerance of not less than 0% and not more than 20%;

when the tire that is mounted on the specified rim, inflated to the internal pressure of 50 kPa, and placed in the no-load state is viewed as the cross-section from the tire meridian direction, a height Hi of an inflection point of the folded back portion of the carcass layer, taking a measurement point of a rim diameter as a reference, and a rim flange height Hf are in a range of 1.65≤Hi/Hf; and the folded back portion of the carcass layer on each of the outer sides has a single one of the inflection point.

* * * * *